US011732788B2

(12) United States Patent
West

(10) Patent No.: US 11,732,788 B2
(45) Date of Patent: Aug. 22, 2023

(54) LOW FORCE EPICYCLIC GEAR APPARATUS HOLD AND RELEASE MECHANISM

(71) Applicant: WEDGEROCK LLC, Limerick, ME (US)

(72) Inventor: Thomas C West, Standish, ME (US)

(73) Assignee: WedgeRock LLC, Limerick, ME (US)

( * ) Notice: Subject to any disclaimer, the term of this patent is extended or adjusted under 35 U.S.C. 154(b) by 0 days.

(21) Appl. No.: 16/964,588

(22) PCT Filed: Jan. 22, 2019

(86) PCT No.: PCT/US2019/014636
§ 371 (c)(1),
(2) Date: Jul. 23, 2020

(87) PCT Pub. No.: WO2019/147598
PCT Pub. Date: Aug. 1, 2019

(65) Prior Publication Data
US 2021/0041012 A1    Feb. 11, 2021

Related U.S. Application Data

(60) Provisional application No. 62/620,784, filed on Jan. 23, 2018.

(51) Int. Cl.
*F16H 35/00* (2006.01)
*F16D 13/08* (2006.01)
(Continued)

(52) U.S. Cl.
CPC .............. *F16H 35/00* (2013.01); *F16D 13/08* (2013.01); *F16H 1/28* (2013.01); *F16H 57/10* (2013.01);
(Continued)

(58) Field of Classification Search
CPC .... F16H 35/00; F16H 2035/005; F16H 33/14; F16H 1/28; F16H 57/10; F16D 13/08; B66D 1/22; B66D 1/225; B66D 2700/03
See application file for complete search history.

(56) References Cited

U.S. PATENT DOCUMENTS 746,323 A * 12/1903 Gaylord .............. F16H 61/0293
475/254
1,352,653 A    9/1920 Brown
(Continued)

FOREIGN PATENT DOCUMENTS

DE          377685      6/1923
DE    202012007843 U1 * 11/2013    ........... B66D 1/7415
EP         1052365     12/2004

OTHER PUBLICATIONS

European Patent Office, European search report, dated Mar. 10, 2021.
(Continued)

*Primary Examiner* — Lori Wu
(74) *Attorney, Agent, or Firm* — Caseiro Burke LLC; Chris A. Caseiro

(57) ABSTRACT

A gear apparatus for controlling movement of an output by an input coupled to a power source. The apparatus an input member coupled to the input, an output member coupled to the output and the input member so that movement of the input member causes movement of the output, a selectably releasable member coupled to the input member and the output member, wherein the selectably releasable member remains in a fixed position while the input member and the output member move, and a releasable member brake mechanism coupled to the selectably releasable member, wherein the releasable member brake mechanism is arranged to prevent movement of the selectably releasable member when the input member and the output member (Continued)

move and to allow back driving of the selectably releasable member.

16 Claims, 3 Drawing Sheets

(51) Int. Cl.
    *F16H 1/28*     (2006.01)
    *F16H 57/10*     (2006.01)
    *B66D 1/22*     (2006.01)

(52) U.S. Cl.
    CPC .......... *B66D 1/225* (2013.01); *B66D 2700/03* (2013.01); *F16H 2035/005* (2013.01)

(56) References Cited

U.S. PATENT DOCUMENTS

| | | | |
|---|---|---|---|
| 1,609,074 A | 11/1926 | Evans | |
| 1,651,760 A * | 12/1927 | Funk | B65F 3/00 |
| | | | 254/356 |
| 2,224,907 A | 12/1940 | Gee | |
| 3,294,208 A | 12/1966 | Anderson | |
| 3,335,831 A * | 8/1967 | Kains | F16B 1/04 |
| | | | 74/625 |
| 4,215,850 A | 8/1980 | Hasse et al. | |
| 5,029,681 A | 7/1991 | Swiatek | |
| 5,355,981 A | 10/1994 | Itoh et al. | |
| 7,475,661 B2 | 1/2009 | Taye et al. | |
| 2010/0038203 A1 | 2/2010 | Wheals | |
| 2011/0065546 A1* | 3/2011 | Xie | B66D 1/24 |
| | | | 475/296 |
| 2015/0075923 A1 | 3/2015 | Jang et al. | |
| 2016/0245379 A1* | 8/2016 | Daus | B65F 3/00 |
| | | | 254/356 |
| 2017/0009874 A1* | 1/2017 | Thomas | F16H 57/10 |

OTHER PUBLICATIONS

International Searching Authority, Written Opinion of the International Searching Authority, International Search Report, dated May 22, 2019.
International Searching Authority, Written Opinion of the International Searching Authority, International Search Report, dated Jun. 3, 2019.

* cited by examiner

LOW FORCE EPICYCLIC GEAR APPARATUS HOLD AND RELEASE MECHANISM

BACKGROUND OF THE INVENTION

1. Field of the Invention

The present invention relates to a system for reducing the force required to release a load in a rotational system. The invention controls movement of a rotational load in both directions while allowing for the load to be released with a relatively low force.

2. Description of the Prior Art

The use of gear sets, (two or more gears meshed together) is well known for a variety of applications and in a wide range of devices. Typically, when two or more gears of any type (e.g. spur, planetary, worm) are meshed with one another, each gear in the chain can drive the others in either rotational direction (i.e. clockwise or counterclockwise direction). Depending upon the frictional forces inherent in the gear set, system forces acting on the resting gears may at times cause unwanted movement thereof (in either the clockwise or counterclockwise directions). For example, when a gear set is used with a cable drum to raise a load, it is desired that the load does not drop when power is removed from the input. It is further desired that the load may be lowered by applying a force to the input. In some cases, such as an emergency, it may be desired that the load is dropped without force to the input and that the actuating force required to drop the load is relatively low.

Most commonly an approach to allow the load to be raised and lowered but not dropped is to provide a self-locking gear set; that is, to fabricate a worm and gear set that has a low helix angle, (typically less than 6 degrees), which may be considered self-locking because the frictional forces are greater than the back-driving forces causing them to be self-locking. These systems inherently have low efficiency, (less than 35%). In such systems, the normal force acting on the gear times the coefficient of friction results in tangential force that is typically greater than the opposite tangential force caused by the back-driving force. Inefficient gear sets tend to be disadvantageous in that larger power sources are required to operate the device. There is also no allowance for the load to be dropped when desired without force applied to the input.

In another approach, a power source (e.g. a manual hand wheel or electric motor) can be coupled to a gear set that is further connected to an output, such as a cable drum, for example. When the gear set is a planetary epicyclic gear set, it includes a sun gear, a plurality of planet gears and a ring gear. A planet carrier is coupled to the planetary gears and to the output. The output may be rotated to a desired position by actuation of the power source (e.g., by rotation of a hand wheel) that causes movement of an input shaft, which either turns the sun gear with the ring gear fixed, or it turns the ring gear with the sun gear fixed. In either configuration, the planet gears rotate around the ring gear and the carrier rotates with the planet gears. In certain conditions, a load associated with the output can cause a backdrive of the gear set and, relatedly, the power source. Such backdriving of the gear set and the power source tends to be undesirable for many applications.

Existing apparatuses and mechanisms are known in the art for locking drive trains of various types to minimize or reduce backdrive. The force required to move and prevent the movement of a load can be substantial and so many such gear systems become very large, require substantial energy to actuate and are very expensive. The mechanisms for preventing backdrive of such mechanisms are also correspondingly large, difficult to operate and expensive.

Devices exist that allow transmission torque to be transferred from the input to the output while preventing backdriving. Most of these are limited in the amount of torque they can handle for a given size. Current anti-backdrive devices similar to this (e.g., U.S. Pat. No. 3,335,831) use pins in larger holes so that forward driving torque causes a higher compressive load on transfer blocks/brakes than the output arrangement; therefore, when the drivetrain is driven forward, it compresses the transfer blocks/brakes and allows motion. When it is back driven, there is no compressive load from the input side and the transfer blocks/brakes expand and push on the housing preventing back driving. This design is undesirable due to the size of the system to handle the required torque because all of the force is transferred through the pins.

What is needed is an apparatus that can be used to actuate large loads at reasonable cost and has a low force required to release the load. What is also needed is such a gear apparatus with an effective backdrive braking system that is relatively easy to operate and relatively inexpensive that can transfer large torques as compared to the shaft size. More specifically, there is a need in a wide range of applications for a gear system that can be driven in one or both directions while preventing the system from being backdriven but having a provision that allows for backdriving when desirable. An example of such an application is a gear system used to raise a dam gate and hold it in place, allowing the gate to be lowered for normal operation and additionally allowing the dam to be dropped in the case of emergency.

SUMMARY OF THE INVENTION

The present invention is a gear apparatus arranged to transfer an input force to an output load. The present gear apparatus is configured to transfer torque from the input force to the output load while suitable for use in relatively large output conditions. It is also configured to prevent backdriving. The apparatus includes an input member coupled to the input so that movement of the input causes movement of the input member, an output member coupled to the input member so that movement of the input member causes movement of the output member, and wherein movement of the output member causes movement of the output, a selectably releasable member coupled to the input member and the output member, wherein the selectably releasable member remains in a fixed position while the input member and the output member move, and a releasable member brake mechanism coupled to the selectably releasable member, wherein the releasable member brake mechanism is arranged to prevent movement of the selectably releasable member when the input member and the output member move and to allow back driving of the selectably releasable member.

In a first embodiment, the apparatus includes an epicyclic planetary gear arrangement, wherein the input member is a ring gear, the output member is a carrier and the selectably releasable member is a sun gear. In that embodiment, the releasable member brake mechanism includes a sun gear brake and a brake release controller, where the sun gear brake is releasably coupled to the sun gear and arranged to prevent movement of the sun gear when the ring gear rotates, and wherein the brake release controller decouples the sun gear brake from the sun gear for back driving of the sun gear.

In a second embodiment, the apparatus includes an epicyclic planetary gear, wherein the input member is a sun gear, the output member is a carrier and the selectably releasable member is a ring gear. In that embodiment, the releasable member brake mechanism is a load reducing gear train having a first end coupled to the ring gear and a second end releasably coupled to a gear train brake and a brake release controller, wherein the gear train brake is arranged to prevent movement of the ring gear when the sun gear rotates, and wherein the brake release controller is arranged to decouple the gear train brake from the gear train for back driving of the ring gear.

In a third embodiment, the apparatus includes an epicyclic gear set, wherein the input member is an input gear that may be a bevel gear, the output member is an output gear that may be a bevel gear and the selectably releasable member is a carrier gear. In that embodiment, the releasable member brake mechanism includes a locking gear coupled to the carrier gear, a gear brake and a brake release controller, where the gear brake is releasably coupled to the locking gear and arranged to prevent movement of the locking gear when the input gear rotates, and wherein the brake release controller decouples the gear brake from the locking gear for back driving of the carrier gear.

In the first embodiment, the sun gear brake mechanism that is configured to maintain the sun gear in a fixed position and that is also configured to enable release of the sun gear brake mechanism so that the sun gear can rotate and thereby let the gear set be back driven when necessary. Because of the mechanical advantage gained through the gear ratios in the planetary system this embodiment substantially reduces the force required to controllably reverse the rotation of the gear set, particularly when the output load is relatively large. The first embodiment of the present invention requires substantially less force than is currently required in other systems. This embodiment disengages the sun gear brake mechanism and allows sun gear rotation while keeping the ring gear still.

In the second embodiment, the gear train substantially reduces the force required to disengage a brake or clutch mechanism that is coupled to the ring gear rather than to the sun gear. The gear train comprises a plurality of spur gears coupled to the ring gear and successively to each other. The gears of the gear train continue increasing the mechanical advantage as they extend away from the ring gear and are selected to reduce substantially the force required to disengage the brake or clutch associated with ring gear rotation to allow ring gear rotation. In this embodiment, the brake or clutch is coupled to the gear of the gear train that is positioned farthest from the ring gear.

In the third embodiment, the epicyclic gear set includes a rotating input gear that may be a bevel gear, one or more rotating gears that may also be bevel gears engaged with the fixed carrier gear and a output gear that may be an output bevel gear. The locking gear coupled to the carrier gear substantially reduces the force required to disengage the brake or clutch mechanism that is coupled to the carrier. The locking gear can be a single gear or a locking gear train to further reduce the force required to disengage the brake or clutch mechanism.

The gear apparatus of the present invention also includes a brake or clutch mechanism to prevent backdrive of the input actuator. The brake or clutch mechanism may be a sprag clutch, for example, coupled to an input shaft and arranged to enable rotation of the shaft in only one direction. The brake or clutch is not limited to a Sprague clutch but could be any sort of functionally equivalent unidirectional device. The brake or clutch mechanism can be any sort of functionally equivalent bidirectional anti backdrive device.

The present invention provides a gear apparatus that enables the rotation of an input shaft to a system clockwise and counterclockwise. The apparatus does not allow an output to be back driven by the force of a load to be maintained in a stationary position when desired. The apparatus does allow for release of the sun gear brake when desired to manage the load. The force required to actuate the release of the sun gear brake is substantially less than has heretofore been required, particularly for massive loads. Further, the gear apparatus of the present invention does not allow the input shaft to rotate when the load is released by releasing the sun brake mechanism. These and other advantages of the present invention will become apparent to those of skill in the art upon review of the following detailed description, the accompanying drawings and the appended claims.

DETAILED DESCRIPTION OF THE INVENTION

Figure 1:
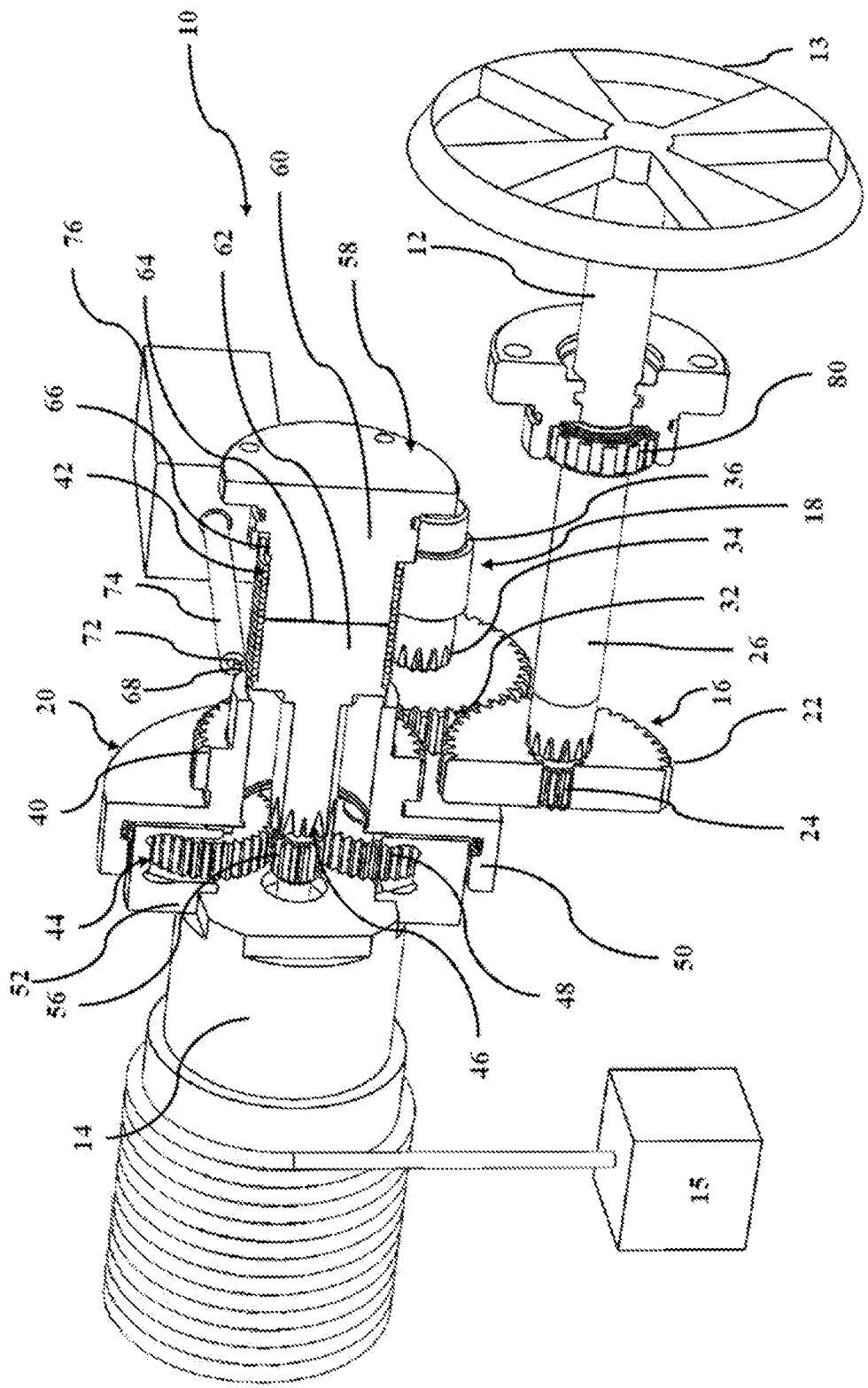
FIG. 1 is a perspective view in partial cross section of a representation of a first embodiment of a gear apparatus of the present invention coupled to a source to move an output and showing a first backdrive braking element.

A first embodiment of a gear apparatus 10 used to couple an input 12 to an output 14 is shown in FIG. 1. The gear apparatus 10 includes an input gear assembly 16, an optional idler gear assembly 18 and an output gear assembly 20. The input gear assembly 16 is coupled to the input 12, such as an input shaft 12 that can be actuated by a power source 13, such as a wheel or a powered actuator but not limited thereto. The output gear assembly 20 is coupled to the output 14, such as an output shaft 14 that is coupled to a load 15 to be moved, such as a weight on a cable drum but not limited thereto. The idler gear assembly 18 couples the input gear assembly 16 to the output gear assembly 20. The idler gear assembly 18 is configured and arranged to transfer input drive from the input gear assembly 16 to the output gear assembly 20 so that the output 14 rotates in the same direction as the rotation of the input 12. It is to be understood that the gear apparatus 10 of the present invention may also be configured without the optional idler gear assembly 18 between the input gear assembly 16 and the output gear assembly 20, recognizing that the output rotation will be the reverse of the input rotation in that configuration.

The input gear assembly 16 includes an input gear 22 affixed by a spline 24 to an input gear shaft 26. The input gear 22 is shown as a spur gear but is not limited thereto. It is understood that the gear 22 and the gear shaft 26 can be made from a single piece. The input gear shaft 26 is coupled to the input shaft 12, which can be one and the same in an embodiment of the invention with the first backdrive braking element 80 of the invention described herein. The input gear assembly 16 is arranged to substantially prevent back driving in one or the other direction. That is, the input gear assembly 16 is configured to prevent backdrive of the input shaft 12 in one or the other direction.

The idler gear assembly 18 includes an idler gear 32 affixed by a spline 34 to an idler gear shaft 36. It is understood that the gear 32 and the gear shaft 36 can be made from a single piece. The idler gear 32 is a spur gear but is not limited thereto. The idler gear 32 is engaged with the input gear 22. In an optional embodiment of the invention, the idler gear assembly 18 may be eliminated and the input gear 22 is coupled directly to the output gear assembly 20.

The output gear assembly 20 includes a ring drive 40, a sun gear brake mechanism 42 and a planetary gear set 44. The planetary gear set 44 is an epicyclic gear set including a sun gear assembly 46, a plurality of planetary gears 48, a gear ring 50 and a carrier 52. The ring drive 40 is shown as a spur gear engaged with the idler gear 32 so that when the input gear shaft 26 is rotated in a first direction, the idler gear 32 rotates in a second opposing direction and the ring drive 40 rotates in the first direction. The ring drive 40 is coupled to the gear ring 50 and rotates the gear ring 50 in the first direction. It is understood that the gear ring 50 can be driven with a chain, belt or any other device suitable for such actuation. The sun gear assembly 46 includes a sun gear 56 affixed to a lower shaft body 62. The lower shaft body 62 is arranged to remain in a fixed position upon rotation of the gear ring 50, wherein the sun gear brake mechanism 42 is arranged to maintain the lower shaft body 62 in a fixed position. The planetary gears 48 rotate about the sun gear 56 upon rotation of the gear ring 50. The carrier 52 is coupled to the planetary gears 48 and to the output 14 so that rotation of the planetary gears 48 causes rotation of the carrier 52 that in turn causes rotation of the output 14.

The sun gear shaft assembly 58 includes an upper shaft body 60 affixed to the lower shaft body 62. The sun gear brake mechanism 42 is configured to prevent rotation of the sun gear 56 when engaged therewith, including when the gear ring 50 rotates. In an embodiment of the invention, the sun gear brake mechanism 42 is a wrap spring clutch (but not limited thereto) that extends about the circumference of the sun gear shaft assembly 58 above and below interface 64 between the upper shaft body 60 and the lower shaft body 62. The wrap spring clutch 42 includes a first end 66 and a second end 68. The first end 66 is affixed to the upper shaft body 60. The second end 68 terminates in a tang 72 that is couplable to a plunger 74 of a sun gear release controller 76. The wrap spring clutch 42 functions to prevent back drive of the sun gear 56 when engaged with the lower shaft body 62. Specifically, when the input 12 is engaged and rotated, or the output 14 is in a desired state, the wrap spring clutch 42 is engaged with the lower shaft body 62 and functions as a brake that prevents rotation of the lower shaft body 62. On the other hand, when it is necessary to have the sun gear 56 rotate to reverse the state of the output 14, the sun gear release controller 76 can be actuated. Actuation of the sun gear release controller 76 causes movement of the plunger 74, which causes movement of the wrap spring tang 72. Movement of the tang 72 causes the wrap spring clutch 42 to expand and thereby decouple from the lower shaft body 62 enough to allow the sun gear 56 to rotate. The gear ring 50 is held still when the input shaft 12 is held still by a backdrive braking element described herein, the sun gear 56 rotates and releases, allowing the gear apparatus to be back driven. The sun gear release controller 76 may be a solenoid or a line pressure operator but is not limited thereto. The solenoid may be any of those known in the art whether normally open or normally closed. In this configuration of the present invention, the force required to release the potential energy of the output gear assembly 20 using the sun gear release controller 76 is substantially less than the force required to release that energy for an equivalent load when there is a release controller coupled directly to the gear ring 50. Similarly, the force inherent in the wrap spring required to keep the wrap spring clutch 42 engaged with the lower shaft body 62 using the sun gear release controller 76 is also less than would otherwise be required.

The input gear assembly 16 includes a backdrive braking element 80 to prevent backdrive of the input shaft 12. The backdrive braking element 80 may be a sprag clutch (but not limited thereto) for example, as shown in FIG. 1, that permits rotation of the input shaft 12 in one direction preventing its backdrive. While the backdrive braking element 80 is a unidirectional one, it is to be understood that a bi-directional anti-backdrive element, such as a bi-directional anti-backdrive clutch may be employed to provide a similar function.

Figure 2:
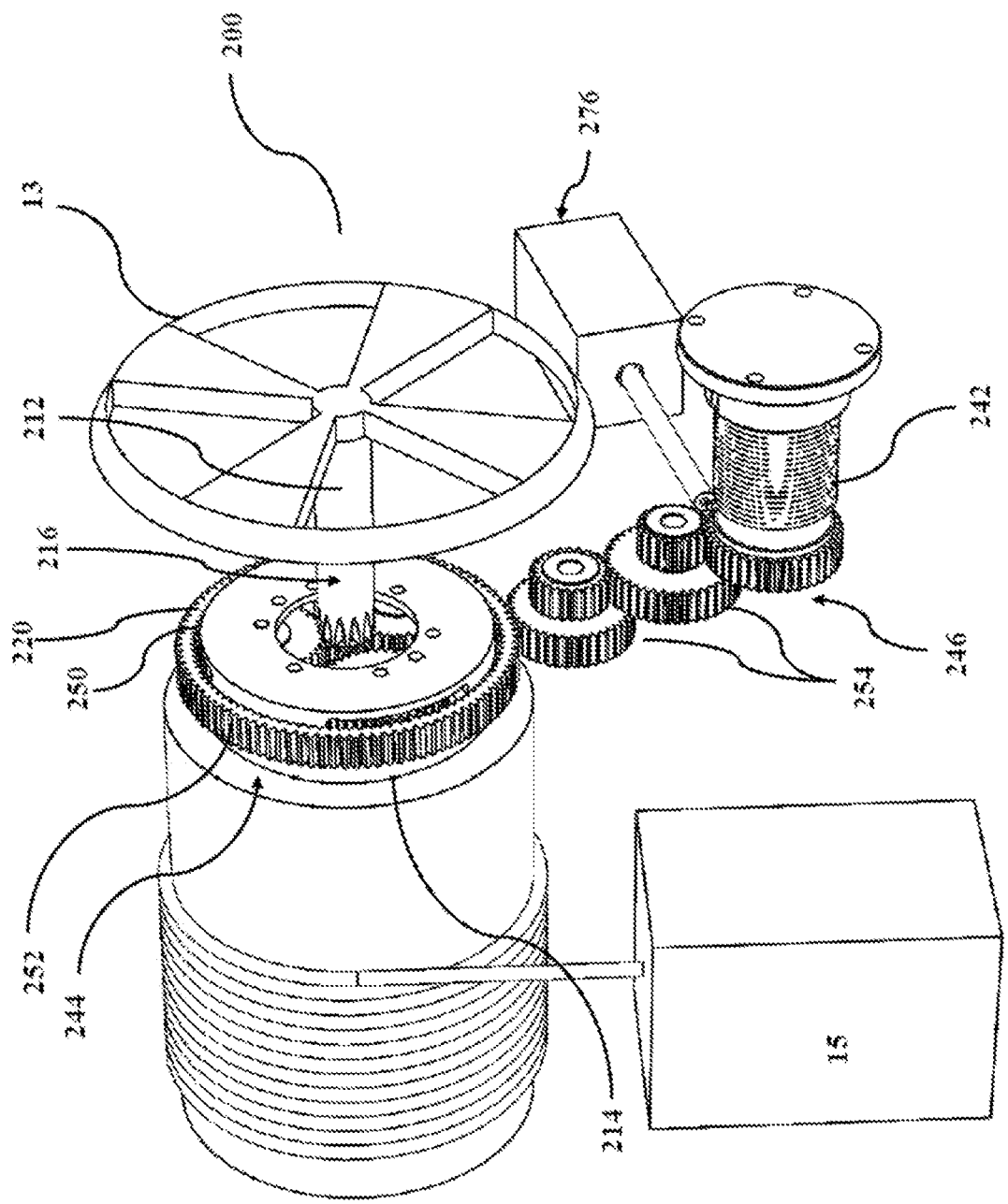
FIG. 2 is a top perspective view of a second embodiment of the gear apparatus of the present invention.

A second embodiment of a gear apparatus 200 of the present invention used to couple an input 212 to an output 214 is shown in FIG. 2. The gear apparatus 200 includes an input gear assembly 216 and an output gear assembly 220. The input gear assembly 216 is coupled to the input 212, such as an input shaft 212 that can be actuated by a power source 13, such as a wheel or a powered actuator but not limited thereto. The output gear assembly 220 is coupled to the output 214, such as an output shaft 214 that is coupled to a load 15 to be moved, such as a weight on a cable drum but not limited thereto.

The output gear assembly 220 includes a gear brake mechanism 242, a planetary gear set 244 and a gear reducing gear train 246. The planetary gear set 244 is an epicyclic gear set including a sun gear assembly, a plurality of planetary gears, a gear ring 250 and a carrier. The planetary gear set 244 is substantially like the planetary gear set 44 of FIG. 1. The gear reducing gear train 246 is engaged with outer gear 252 of the gear ring 250 and includes a plurality of train gears 254 that reduce the load required to maintain the gear ring 250 in a fixed position when the gear brake mechanism 242 is engaged.

The gear brake mechanism 242 is similar to the sun gear brake mechanism 42 of FIG. 1 in that it is configured to prevent rotation of the gear reducing gear train 246 and, in turn, the gear ring 250 when engaged therewith. In an embodiment of the invention, the gear brake mechanism 242 is a wrap spring clutch the movement of which is controlled by brake release controller 276, which is substantially the same as the sun gear release controller 76 of FIG. 1. The wrap spring clutch 242 functions to prevent back drive of the gear ring 250. Specifically, when the input 212 is engaged and rotated, or the output 214 is in a desired state, the wrap spring clutch 242 functions as a brake that prevents rotation of the gear train 246. On the other hand, when it is necessary to allow the gear ring 250 to rotate backdriving the gear set, the brake release controller 276 can be actuated. Actuation of the brake release controller 276 allows the gear ring 250 to rotate. The brake release controller 276 may be a solenoid or a line pressure operator but is not limited thereto. In this configuration of the present invention, the force required to release the potential energy of the output gear assembly 220 using the brake release controller 276 is substantially less than the force required to release that energy for an equivalent load when there is a release controller coupled directly to the gear ring 250. The apparatus 200 of FIG. 2 may also include other forms of anti-backdrive mechanisms including bi-directional anti-backdrive mechanisms.

Figure 3:
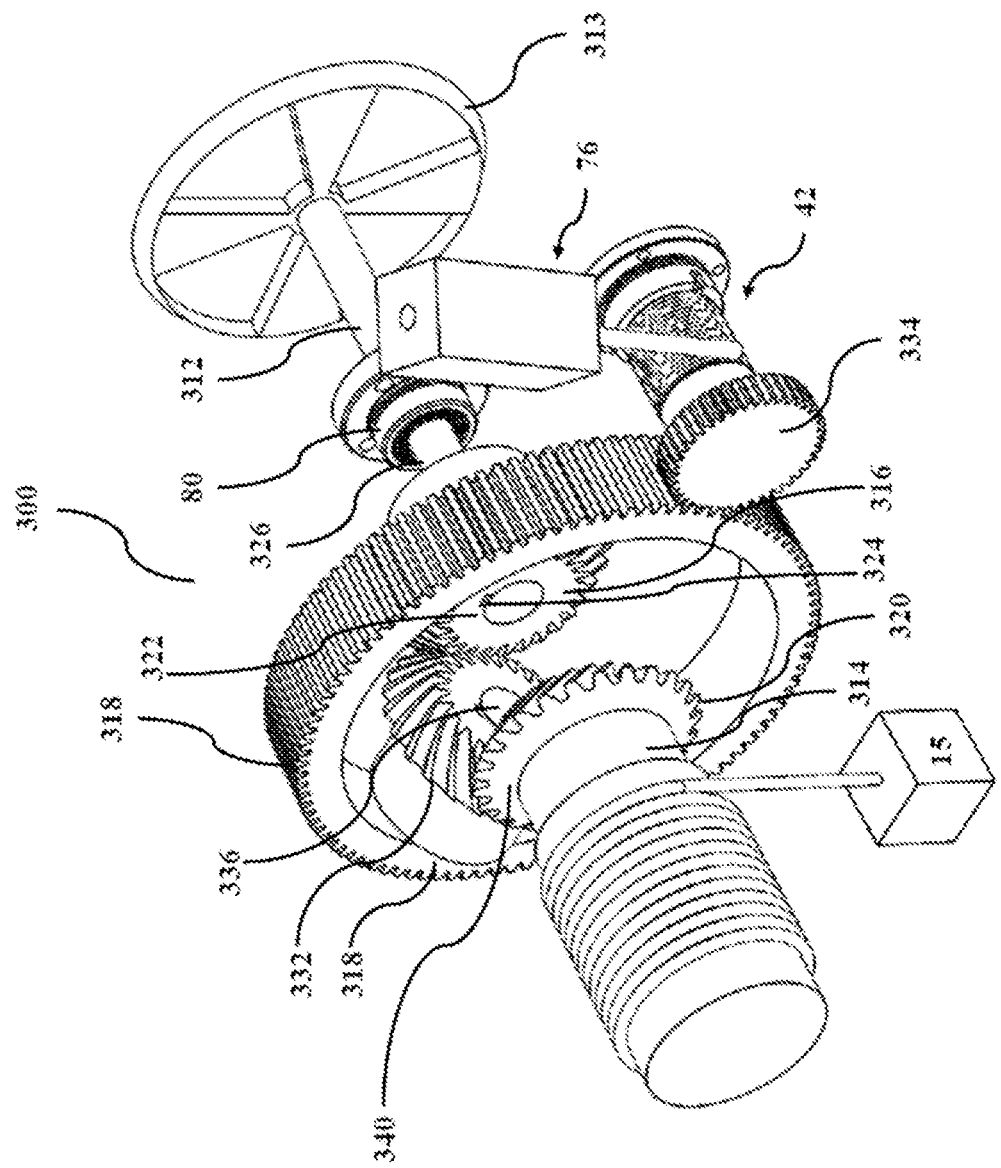
FIG. 3 is a top perspective view of a third embodiment of the gear apparatus of the present invention.

A third embodiment of a gear apparatus 300 of the present invention used to couple an input 312 to an output 314 is shown in FIG. 3. The gear apparatus 300 includes an input gear assembly 316, an idler gear assembly 318 and an output gear assembly 320. The input gear assembly 316 is coupled to the input 312, such as an input shaft 312 that can be actuated by a power source 313, such as a wheel or a powered actuator but not limited thereto. The output gear assembly 320 is coupled to the output 314, such as an output shaft 314 that is coupled to a load 15 to be moved, such as a weight on a cable drum but not limited thereto. The idler gear assembly 318 couples the input gear assembly 316 to the output gear assembly 320. The idler gear assembly 318 is configured and arranged to transfer input drive from the input gear assembly 316 to the output gear assembly 320 and is engaged with the locking ring gear carrier 338.

The input gear assembly 316 includes an input gear 322 affixed by a key 324 to an input gear shaft 326. The input gear 322 is shown as a bevel gear but is not limited thereto for other types of epicyclic gear sets. It is understood that the input gear 322 and the gear shaft 326 can be a unitary piece. The input gear shaft 326 is coupled to the input shaft 312, which can be one and the same in an embodiment of the invention with the first backdrive braking element 80 of the invention described herein. The input gear assembly 316 is arranged to substantially prevent back driving in one or the other direction. That is, the input gear assembly 316 is configured to prevent backdrive of the input shaft 312 in one or the other direction.

The idler gear assembly 318 includes an idler gear 332 engaged to rotate about the idler gear shaft 336. The idler gear shaft 336 is coupled to the carrier gear 338. The carrier gear 338 is engaged with the locking gear 334 which is coupled to the brake mechanism 42 previously described herein. The idler gear 332 is shown as a bevel gear but is not limited thereto for this and other types of epicyclic gear sets. The idler gear 332 is engaged with the input gear 322. The output gear assembly 320 includes an output gear 340 coupled to the output shaft 314. The output gear 340 is shown as a bevel gear but is not limited thereto. The apparatus 300 of FIG. 3 may include a brake mechanism such as brake mechanism 42 of FIG. 1. It may also include other forms of anti-backdrive mechanisms.

The invention has been described with respect to certain embodiments that are not intended to be limiting. The scope of the invention is defined by the appended claims and reasonable equivalents of the same.

What is claimed is:

1. An apparatus for regulating movement of an output caused by movement of an input, wherein the input is coupled to a power source, the apparatus comprising:
   an input member coupled to the input so that movement of the input causes movement of the input member;
   an output member coupled to the input member so that movement of the input member causes movement of the output member, and wherein movement of the output member causes movement of the output;
   a selectably releasable member variably coupled to the input member and the output member, wherein the selectably releasable member remains in a fixed position while the input member and the output member move; and
   a selectably releasable member brake mechanism coupled to the selectably releasable member, wherein the selectably releasable member brake mechanism is arranged to prevent movement of the selectably releasable member when the input member and the output member move and to allow back driving of the selectably releasable member, wherein the selectably releasable member brake mechanism includes a brake and a brake release controller, wherein the brake is arranged to prevent movement of the selectably releasable member when the input member rotates, and wherein the brake release controller is arranged to decouple the brake from the selectably releasable member to permit back driving of the selectably releasable member.

2. The apparatus of claim 1 that includes an epicyclic planetary gear, wherein the input member is a ring gear, the output member is a carrier and the selectably releasable member is a sun gear.

3. The apparatus of claim 2 wherein the brake is a sun gear brake, where the sun gear brake is releasably coupled to the sun gear and arranged to prevent movement of the sun gear when the ring gear rotates, and wherein the brake release controller decouples the sun gear brake from the sun gear for back driving of the sun gear.

4. The apparatus of claim 3 wherein the sun gear brake is a wrap spring including a fixed first end coupled to a shaft body and a second end coupled to the brake release controller.

5. The apparatus of claim 4 wherein the brake release controller is a solenoid.

6. The apparatus of claim 1 that includes an epicyclic planetary gear, wherein the input member is a sun gear, the output member is a carrier and the selectably releasable member is a ring gear, wherein the releasable member brake mechanism is a gear reducing gear train having a first end coupled to the ring gear and a second end releasably coupled to the brake wherein the brake is a gear train brake and the brake release controller, wherein the gear train brake is arranged to prevent movement of the ring gear when the sun gear rotates, and wherein the brake release controller is arranged to decouple the gear train brake from the gear train for back driving of the ring gear.

7. The apparatus of claim 6 wherein the gear train brake is a wrap spring clutch.

8. The apparatus of claim 6 wherein the brake release controller is a solenoid.

9. The apparatus of claim 1 that includes an epicyclic gear set, wherein the input member is an input bevel gear, the output member is an output bevel gear and the selectably releasable member is a carrier gear.

10. The apparatus of claim 9 wherein the releasable member brake mechanism includes a locking gear coupled to the carrier gear, the brake, wherein the brake is a gear brake and the brake release controller, where the gear brake is releasably coupled to the locking gear and arranged to prevent movement of the locking gear when the input bevel gear rotates, and wherein the brake release controller decouples the gear brake from the locking gear for back driving of the carrier gear.

11. The apparatus of claim 10 wherein the gear brake is a wrap spring clutch.

12. The apparatus of claim 10 wherein the brake release controller is a solenoid.

13. The apparatus of claim 1 further comprising a backdrive braking element coupled to the input member.

14. The apparatus of claim 13 wherein the backdrive braking element is a unidirectional anti-backdrive mechanism or a bi-directional anti-backdrive mechanism.

15. The apparatus of claim 14 wherein the backdrive braking element is a sprag clutch arranged for engagement with the input member.

16. An apparatus for regulating movement of an output caused by movement of an input, wherein the input is coupled to a power source and to a planetary gear, the apparatus comprising:
- a selectably releasable ring gear of the planetary gear coupled to the input so that movement of the input causes movement of the ring gear;
- a carrier of the planetary gear coupled to the ring gear so that movement of the ring gear causes movement of the carrier, and wherein the carrier is coupled to the output so that movement of the carrier causes movement of the output;
- a sun gear of the planetary gear coupled to the ring gear and the carrier, wherein the sun gear remains in a fixed position while the ring gear and the carrier move;
- a sun gear brake releasably coupled to the sun gear, wherein the sun gear brake is arranged to prevent movement of the sun gear when the ring gear and the carrier move; and
- a brake release controller coupled to the sun gear brake, wherein the brake release controller is arranged to decouple the sun gear brake from the sun gear for back driving of the sun gear, wherein the sun gear brake is a wrap spring.

* * * * *